United States Patent [19]

Yamaguchi et al.

[11] Patent Number: 5,440,630
[45] Date of Patent: Aug. 8, 1995

[54] TELEPHONE RECEIVER WITH ELECTROSTATIC DISCHARGE PREVENTION

[75] Inventors: Takuro Yamaguchi, Tokyo; Yoshinori Wada, Akishima, both of Japan; Mark A. Armstrong, Stittsville, Canada

[73] Assignees: Foster Electric Co., Ltd.; Mitel Corporation, Canada

[21] Appl. No.: 198,537

[22] Filed: Feb. 18, 1994

Related U.S. Application Data

[63] Continuation of Ser. No. 999,801, Dec. 28, 1992, abandoned, which is a continuation of Ser. No. 650,044, Feb. 4, 1991, abandoned.

[30] Foreign Application Priority Data

Feb. 8, 1990 [JP] Japan ................ 2-11759 U

[51] Int. Cl.⁶ .................................. H04M 1/00
[52] U.S. Cl. ...................... 379/437; 379/433; 379/451; 381/79; 381/188; 381/194
[58] Field of Search ............... 379/419, 428, 429, 433, 379/438, 443, 451; 381/79, 192, 194, 188

[56] References Cited

U.S. PATENT DOCUMENTS

| | | | |
|---|---|---|---|
| 4,821,320 | 4/1989 | Andert et al. | 379/437 |
| 4,845,760 | 7/1989 | Awakowicz et al. | 381/188 |
| 4,868,876 | 9/1989 | Schiller et al. | 379/437 |
| 4,944,017 | 7/1990 | Cograsse et al. | 381/79 |
| 5,067,151 | 11/1991 | Inagaki et al. | 379/433 |
| 5,155,773 | 10/1992 | Hansen | 381/194 |

FOREIGN PATENT DOCUMENTS

| | | | |
|---|---|---|---|
| 3634619 | 4/1988 | Germany | 379/437 |
| 3634620 | 4/1988 | Germany | 379/437 |
| 3634658 | 4/1988 | Germany | 379/437 |
| 3902683 | 8/1990 | Germany | 379/437 |
| 0091046 | 4/1987 | Japan | 379/451 |

*Primary Examiner*—Curtis Kuntz
*Assistant Examiner*—William Cumming
*Attorney, Agent, or Firm*—Laff, Whitesel, Conte & Saret, Ltd.

[57] ABSTRACT

A receiver including a vibrator plate vibrating together with a voice coil in response to electrification of said voice coil which comprises an electrostatic discharge prevention plate having a central opening arranged above the vibrator plate with a small air gap provided therebetween. A metal cover around the top and sides of the receiver is imbedded in plastic for inhibiting electrostatic discharge via the cover. As a result the discharge path length through the air is substantially increased, reducing the likelihood of electrostatic discharge from the ear of the user.

4 Claims, 2 Drawing Sheets

TELEPHONE RECEIVER WITH ELECTROSTATIC DISCHARGE PREVENTION

This application is a continuation of application Ser. No. 07/999,801, filed Dec. 28, 1992, now abandoned which is a continuation of Ser. No. 07/650,044, filed Feb. 4, 1991, now abandoned.

FIELD OF THE INVENTION

This invention relates to the structure of a telephone receiver or earphone which is capable of improving the electrostatic dielectric strength thereof, whereby the likelihood of electrostatic discharge from the ear of a user is decreased.

BACKGROUND TO THE INVENTION

Conventionally, in the case of using a telephone set, for instance, in a dry area of low relative humidity, there is a possibility that electrostatic charge retained on an user can be discharged to a metal portion of the receiver and/or transmitter of a telephone handset, which can cause failure of an electronic circuit incorporated in the telephone set, resulting in the failure of communication. In addition, the discharge is startling, very annoying and is sometimes painful to the user.

DESCRIPTION OF THE PRIOR ART

A hearing aid adaptive type of telephone receiver as shown in FIG. 1, is comprised of a yoke 1 around which is located a magnetic circuit comprising an annular permanent magnet 2 and an annular plate 3 with a frame assembly 4 being provided at the outer periphery of the magnetic circuit. Further, on the periphery of the frame assembly 4, there is installed a vibrator plate 5, which is able to vibrate and produce sound.

In the central portion of the vibrator plate 5, a voice coil 6 which is integrally connected to the vibrator plate 5 is inserted into the air gap portion between the yoke 1 and the plate 3, and a cover 7 for the unit is provided above the magnetic circuit and the vibrator plate 5.

It should be noted that a hearing aid coil 8 is provided in the vicinity of the vibrator plate 5.

In the case in which the unit cover 7 is made of a resin, electrostatic discharge into the receiver from the opening portion of the unit cover 7 reaches the hearing aid coil 8 through the route A→B→C as indicated in FIG. 1. In the case of a metallic unit cover 7, electrostatic discharges reach the hearing aid coil 8 through the shortest discharge route A'→C.

As shown in FIG. 3, a user of a telephone handset 9 often experiences an electrostatic discharge D between his ear and the receiver, which is startling, very annoying and is sometimes painful.

SUMMARY OF THE INVENTION

The present invention has been designed to solve the above-mentioned problem, and an object of the present device is to provide a telephone receiver in which electrostatic dielectric strength, i.e. discharge inhibition, can be improved by lengthening the discharge path of electrostatic charges and by covering components likely to conduct electrostatic discharge with insulating plastics, thus allowing the longer discharge path to be the effective path.

An embodiment of the invention is comprised of a receiver including a vibrator plate vibrating together with a voice coil in response to electrification of the voice coil which is comprised of an insulating plate for preventing electrostatic discharge, having a central opening arranged above the vibrator plate with a minute air gap provided therebetween and an insulating plastic covering of a DC magnetic flux leakage preventing metallic cover so as to reduce the leakage magnetic flux from the magnet without decreasing electrostatic dielectric strength.

Thus, in the present invention, since the discharge path is substantially longer than that of a conventional receiver, it is more difficult for the discharge to take place, and failure of electronic circuit elements incorporated in the receiver due to discharge can be prevented.

BRIEF INTRODUCTION TO THE DRAWINGS

A preferred embodiment of the present device will be described below with reference to the attached drawings, in which.

DESCRIPTION OF THE PREFERRED EMBODIMENT

Figure 2:
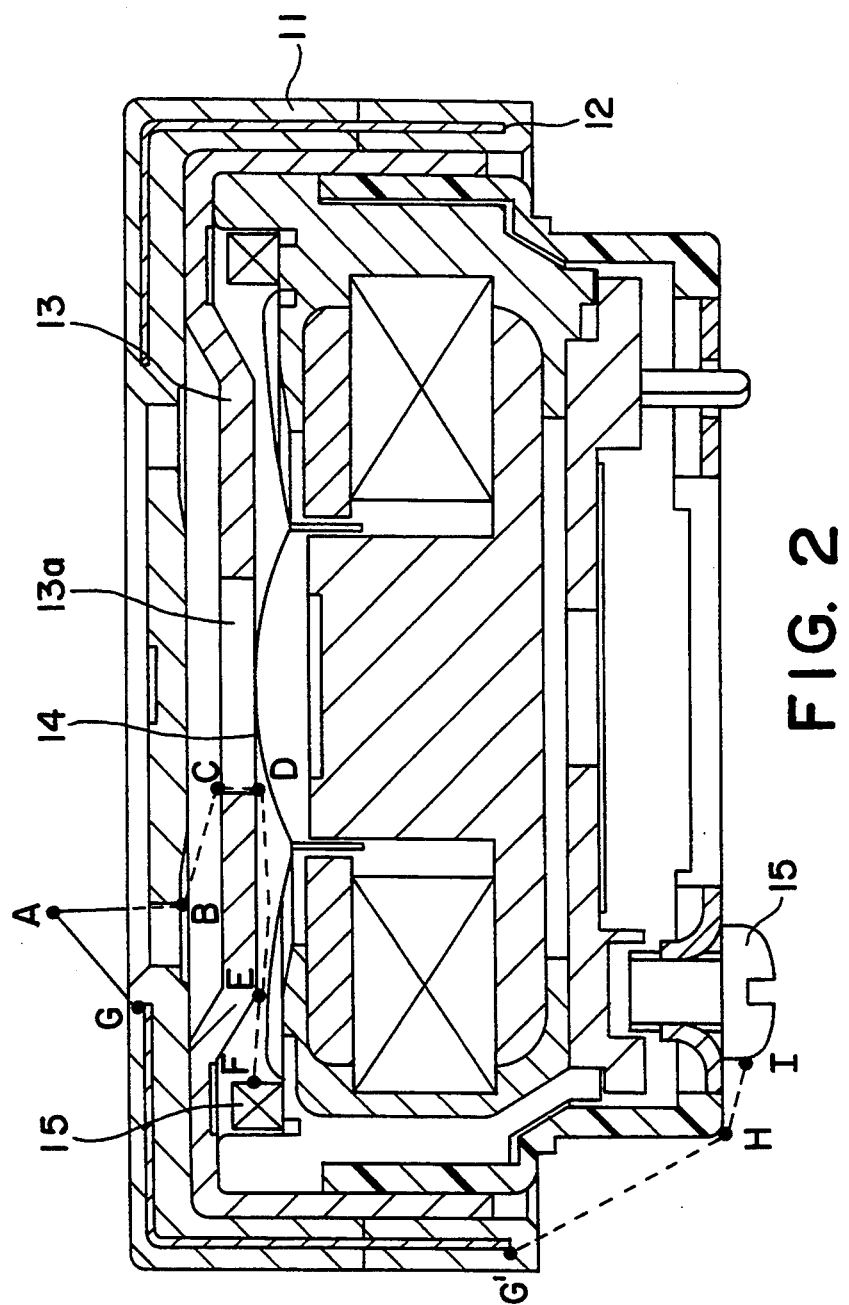
FIG. 2 shows a preferred embodiment in which the present device is applied to a hearing aid type receiver.

In FIG. 2, a receiver is shown, comprised of a non-electrically-conducting electrostatic discharge preventing plate 13 above a sound producing vibrator plate 14 with a minute air gap being provided therebetween, and below the discharge prevention plate 13 and on the outer peripheral side thereof, there is provided a hearing aid coil 15. In the present preferred embodiment, the electrostatic discharge prevention plate 13 is made of synthetic resin such as ABS resin, and a circular opening 13a is formed in the central portion thereof. On the outside thereof, there is provided a metallic cover 12 coated with a non-electrically-conducting material such as plastic and this metallic cover 12 is integrated in a front cover 11.

The operation of the present preferred embodiment will be described below.

Electrostatic charges carried on a human body (point A) are discharged through the route A→B→C→D→E→F, namely electrostatic charges at point A pass through the central opening 13a (points C and D) of the electrostatic discharge prevention plate 13 from the opening portion (point B) formed on the front surface of the front cover 11 and move to the outer peripheral portion (point E) along the rear surface of the plate 13 and reach the hearing aid coil 15 (point F). Finally, the charges reach an internal electronic circuit (not shown) from the hearing aid coil 15. Furthermore, when the metallic cover 12 is not covered with plastic, the discharge path becomes as indicated by A→G→G'→H→I. Electrostatic charges at point A in this case enter at point G into the metallic cover 12 and move to the point G' thereon and then, reach the outside terminal 15 via point H and I.

Figure 1:
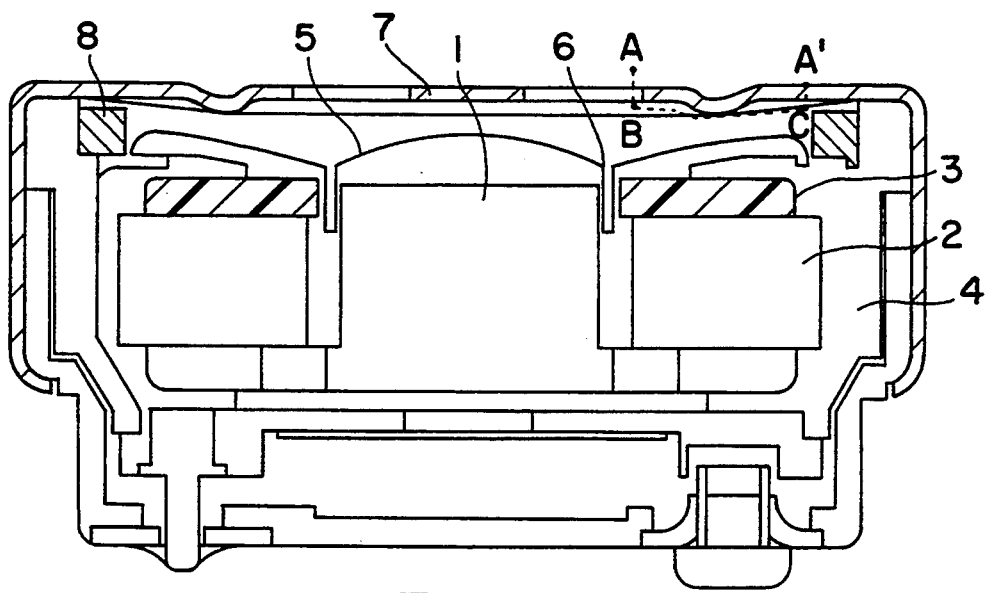
FIG. 1 is a sectional view of a convention hearing aid type receiver.
Figure 3:
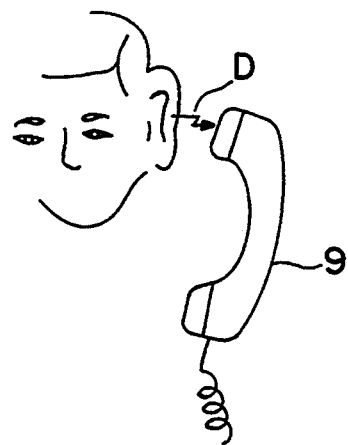
FIG. 3 is a perspective view showing the discharge between a human body and a telephone hand set.

As is clear from the foregoing description, it is to be noted that because of the existence of the electrostatic discharge prevention plate 13, the discharge path of electrostatic charges is considerably increased in length as compared with the aforementioned route shown in FIG. 1. Further, by covering the metallic cover 12 with plastic, the discharge path is prevented from being shortened. A receiver of high electrostatic dielectric strength thus can be obtained even with a receiver of the DC magnetic flux leakage prevention type.

In the above preferred embodiment, the description referred to the case where the present device is applied to a hearing aid type receiver. However, in the case of a common type receiver, since the discharge would be effected into a lead wire of the voice coil located below the hearing aid coil, needless to say, a similar effect can be obtained by applying the present device to that type of receiver.

As described hereinabove, according to the present invention, in a receiver including a vibrator plate vibrating together with a voice coil in response with the electrification thereof, the discharge path of electrostatic charges can be lengthened by arranging a electrostatic discharge prevention plate having a central opening above the vibrator plate with a minute air gap provided therebetween, and thereby the electrostatic dielectric strength can be improved.

Further, by covering the metallic cover with plastic, the discharge path is prevented from being reduced in length, and even in case of a receiver of DC magnetic flux leakage prevention type, a receiver of high electrostatic dielectric strength becomes possible.

We claim:

1. A receiver, comprising:
   (a) an electroacoustic transducer comprising a voice coil and a vibrating element coupled to the voice could and being coaxially disposed in front of the voice coil, an electrically conductive magnetic circuit surrounding the voice coil comprised of an annular magnet and an annular plate in contact with the magnet, the magnet extending coaxially to the voice coil a distance in a direction opposite to the vibrating element,
   (b) an electrically insulating generally cup shaped housing through which conductive contacts pass, an extending portion of the magnet being contained in said cup shaped housing, conductors of the voice coil being connected to corresponding ones of said contacts,
   (c) an electrically insulating generally cup shaped electrostatic discharge prevention plate containing said transducer, the inside bottom of said plate being spaced from the vibrating element and the sides overlapping sides of said housing, said bottom containing a single small central hole sufficiently large to allow acoustic energy to pass therethrough,
   (d) an electrically insulating generally cup shaped cover containing and disposed over said discharge prevention plate, having sides surrounding the sides and length of said discharge prevention plate, an end of the cover containing plural holes which are offset radially from said small central hole,
   (e) said discharge prevention plate being centrally depressed relative to said end of the cover to form an air gap therebetween, and
   (f) a hearing aid coil wound coaxially with the voice coil and having a diameter significantly larger than the diameter of the voice coil, the hearing aid coil being contained within said cup shaped electrostatic discharge prevention plate outside the depressed region thereof and adjacent the inside bottom thereof,
   whereby electrostatic discharges from a user must progress along a generally U-shaped path passing through a hole in said cover, at an angle through the air gap, through the central hole and radially outwardly to the hearing aid coil.

2. A receiver as defined in claim 1, further including an upper metal housing forming part of said magnetic circuit imbedded completely within said cover,
   whereby electrostatic discharges from a user must progress through insulation of said cover, through said upper metal cover and an air gap adjacent said contacts before reaching said contacts.

3. A receiver as defined in claim 2 wherein said plate is comprised of synthetic resin.

4. A receiver as defined in claim 2 wherein said plate is comprised of ABS resin.

* * * * *